United States Patent [19]
Glidewell et al.

[11] Patent Number: 5,319,698
[45] Date of Patent: Jun. 7, 1994

[54] SECURITY SYSTEM

[75] Inventors: William E. Glidewell, Lewisville; Eddie F. Furr, III, Fort Worth, both of Tex.; Mark J. Witham, London, England

[73] Assignee: Boat Buddy Sentry, Ltd., Fort Worth, Tex.

[21] Appl. No.: 833,949

[22] Filed: Feb. 11, 1992

[51] Int. Cl.⁵ ................... H04M 11/00; H04M 11/04
[52] U.S. Cl. ............................. 379/39; 379/40; 379/41; 379/42; 379/43; 379/44; 379/51; 340/426; 340/539; 340/541
[58] Field of Search ............... 340/984, 986, 541, 539, 340/426; 379/40, 42, 44, 39

[56] References Cited

U.S. PATENT DOCUMENTS

| | | | |
|---|---|---|---|
| 4,742,336 | 5/1988 | Hall et al. | 379/44 |
| 4,809,316 | 2/1989 | Namekawa | 379/44 |
| 4,985,693 | 1/1991 | Sunami | 340/426 |
| 4,990,890 | 2/1991 | Newby | 340/426 |
| 5,008,667 | 4/1991 | Palmer | 340/984 |
| 5,117,217 | 5/1992 | Nykerk | 379/40 |
| 5,130,708 | 7/1992 | Boyden | 340/984 |
| 5,134,644 | 7/1992 | Garton et al. | 340/539 |
| 5,146,486 | 9/1992 | Lebowitz | 379/40 |

Primary Examiner—Curtis Kuntz
Assistant Examiner—Stella L. Woo
Attorney, Agent, or Firm—Richards, Medlock & Andrews

[57] ABSTRACT

A security system for detecting and signalling the presence of abnormal security or hazardous conditions, such as unauthorized entry, glass breakage, fire, smoke, high water level, in individual units, such as a boat, a recreational vehicle, an automobile, which are located or stored in a given security area.. The security system comprises sensor units which, when actuated, transmit coded signals through the atmosphere which identifies each sensor unit and the individual unit on which it is located. A receiver on the individual unit recognizes only the coded signals from sensor units which are on the same individual unit as the receiver. A coded output signal is provided to a slave transmitter on the individual unit which identifies the particular sensor unit which was actuated. The slave transmitter provides a coded transmission signal to a local security station which identifies the particular sensor unit which was actuated and the individual unit where the actuated sensor unit resides. The local security station activates an alarm and dials a sequence of telephone numbers to provide a verbal alarm.

25 Claims, 2 Drawing Sheets

SECURITY SYSTEM

TECHNICAL FIELD OF THE INVENTION

This invention relates generally to security systems. More particularly, but not by way of limitation, this invention relates to a security system for detecting unauthorized intrusion into an individual unit as well as the detecting of a hazardous condition existing in that individual unit and providing notification of such unauthorized intrusion or hazardous condition.

BACKGROUND OF THE INVENTION

In recent times the theft of individual units such as boats, recreational vehicles, trailers, automobiles, etc. as well as items from boats, recreational vehicles, trailers, automobiles, apartments, etc. has grown to alarming proportions.

Several approaches have been adopted in an attempt to combat theft of items from individual units but most if not all approaches have required the owner to be in the area to monitor the system of his own individual unit. When the boat owner docks his boat in the boat slip at the marina and goes home, he is not in the area to monitor his own system on his individual unit or boat. This is also true when (1) the boat owner stores his boat in the dry stacks at the marina in the off season, (2) when the owner of the recreational vehicle or trailer stores his recreational vehicle or trailer in a trailer storage area in the off season, (3) when the owner of an automobile delivers his car to the storage lot of a car mover for a move across country, (4) when the renter of an apartment is gone from his apartment, (5) when the renter of a storage area stores items in storage areas such as individual mini-warehouses, etc. In fact, this is true whenever individual unite are congregated together in a designated or given area.

This invention deals with these as well as related problems and provides a security alarm system which detects and signals the occurrence of a predetermined event with regard to the individual unit, such as unauthorized entry, glass breakage, fire, smoke, unauthorized movement, low battery, high water level in the bilge of a boat, activation of a panic button, via digitally coded messages to a central station which monitors all the individual units in the designated or given area.

SUMMARY OF THE INVENTION

This invention provides a security system for an individual or predetermined unit as well as for a plurality of individual or predetermined units in a given security area and in one aspect comprises a plurality of sensors operatively associated with an individual unit, each sensor being structured to be actuated by the occurrence of a predetermined event, each sensor includes means for encoding and transmitting coded signals through the atmosphere which identifies each sensor and the individual unit with which it is associated; a receiving means associated with the individual unit, each receiving means including means for receiving and recognizing the transmitted coded signals from the sensor associated with the same individual unit as that of the receiving means and including means for providing a plurality of output signals upon receipt and recognition of a transmitted coded signal; a keypad and display unit operatively coupled to exchange predetermined coded signals with the receiving means, an alarm unit to receive an output signal from the keypad and display unit upon the occurrence of a predetermined event; a slave transmitter means associated with each individual unit and operatively coupled to receive an output signal from the receiving means upon the occurrence of a predetermined event, the slave transmitter means includes means for further encoding and transmitting coded signals through the atmosphere which identifies the individual unit and the sensor which has been actuated.

In another aspect, this invention provides a security system for a plurality of individual units in a given security area and comprises a plurality of sensors operatively associated with each of the plurality of individual units, each sensor being structured to be actuated by the occurrence of a predetermined event, each sensor including means for encoding and transmitting coded signals through the atmosphere which identifies each sensor and the individual unit with which it is associated; a plurality of receiving means having a predetermined receiving means associated with each of the plurality of individual units, each predetermined receiving means including means for receiving and recognizing the transmitted coded signals from the plurality of sensors associated with the same individual unit as that of the predetermined receiving means and including means for providing a plurality of output signals upon receipt and recognition of a transmitted coded signal; a plurality of keypad and display units having a keypad and display unit associated with each of the plurality of receiving means and operatively coupled to exchange predetermined coded signals with the associated receiving means, a plurality of alarm units having an alarm unit associated with each of the plurality of keypad and display units and operatively coupled to receive an output signal from the keypad and display unit upon the occurrence of a predetermined event; a plurality of slave transmitter means having a predetermined slave transmitter means associated with each of the plurality of individual units and operatively coupled to receive the output signal from the predetermined receiving means associated with the same individual unit as that of the predetermined slave transmitter means, the predetermined slave transmitter means includes means for further encoding and transmitting coded signals through the atmosphere which identifies the sensor means which has been actuated and the individual unit with which the identified sensor is associated; a central receiver to receive the transmitted coded signals from the predetermined slave transmitter, to decode the transmitted coded signals and provide an output signal in a predetermined format; and a master control unit to receive the output signal from the central receiver means and provide predetermined output functions.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Figure 1:
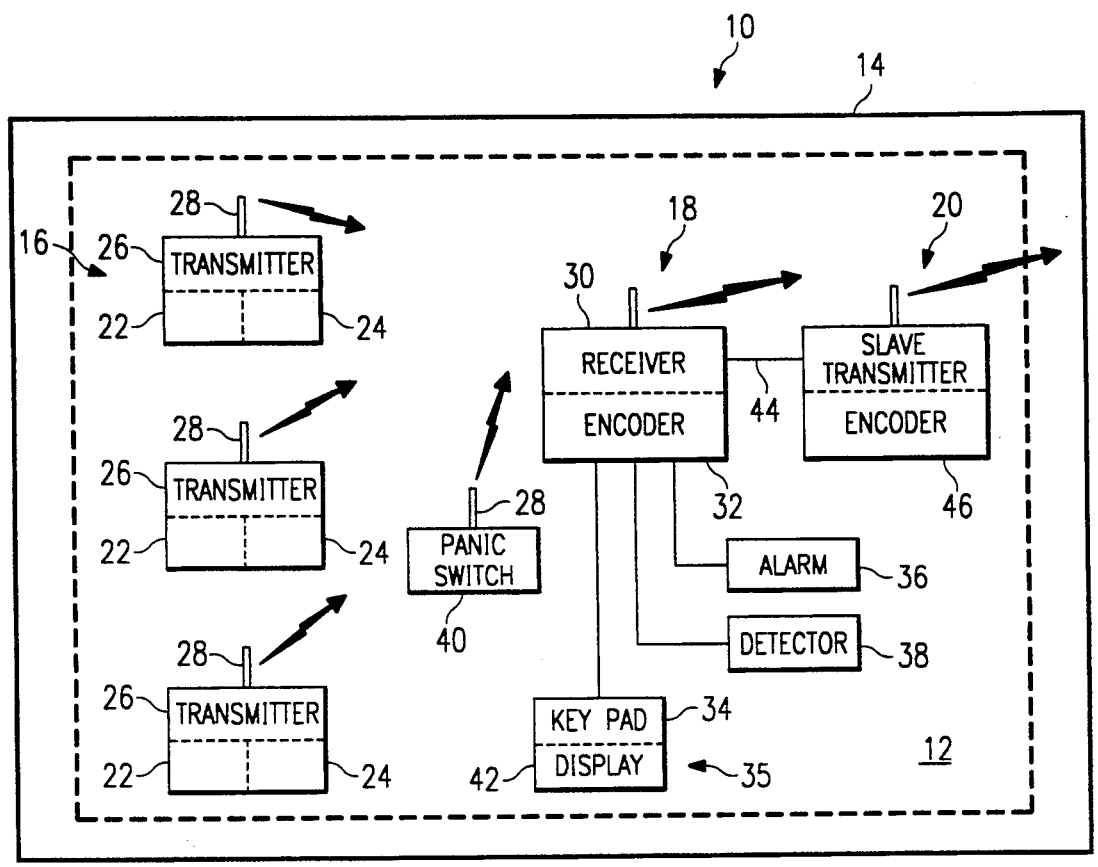
FIG. 1 is a simplified block diagram showing the security system in accordance with one embodiment of the present invention.

Referring to the drawing and FIG. 1 in particular, shown therein and generally designated by the reference character 10 is a security system in accordance with one embodiment of the invention. As illustrated, the security system 10 comprises the individual unit system 12 installed in or on the individual or predetermined unit 14 which is to be monitored for security and hazard purposes. The individual or predetermined unit 14 would comprise a boat, recreational vehicle, trailer, automobile, apartment, mini-warehouse, etc. The individual unit system 12 comprises a plurality of sensor means 16, a receiver means 18 and a slave transmitter 20. Each sensor means 16 includes a detector 22, a digital encoder 24, a transmitter 26 and a radiating unit or antenna 28. Sensor means 16 are structured and positioned in the individual or predetermined units 14 to detect and signal abnormal or emergency conditions, such as unauthorized intrusion; the presence of fire, smoke, gas, carbon monoxide; glass breakage; opening of doors or windows; unauthorized moving of the unit; removal of structure from the outside of the unit; low battery voltage; high water level in the bilge and other well known type of detectors. For instance, the opening of doors or windows and the removal of structure could be detected by the use of magnetic switches. The digital encoder 24 provides for the setting of a digital code for each sensor means 16 which allows identification of each individual unit 14 and each sensor means 16 associated with that individual unit 14. In the preferred embodiment, the digital code comprises eight bits to identify the individual unit 14 and four bits to identify the individual sensor means 16, e.g., magnetic switch, pressure mat, glass breakage, fire, smoke, motion, current, high water, etc. In the preferred embodiment, the selection of the code function is provided by DIP switches. The transmitter 26 would be (1) the rf type in the frequency range and power as approved by the FCC, (2) infrared type, (3) ultrasonic type, etc. which would transmit the coded signal through the atmosphere rather than over cable or land line.

Each receiver means 18 comprises a receiver 30 and digital encoder means 32. The digital encoder means 32 provides for the setting of an eight bit digital code to identify the individual or predetermined unit 14 with which the receiver means 18 is associated and only allows reception of the coded signals from the sensor means 16 for the associated individual or predetermined unit. The eight bit digital code of the receiver means 18 must match the eight bit digital code of each of the sensor means 16 for the associated-individual or predetermined unit. In the preferred embodiment, the selection of the eight bit digital code is provided by DIP switches.

A key pad 34, which is part of the key pad and display unit 35, is operatively coupled to each receiver means 18. Key pad 34 allows the owner or operator of the security system 10 to configure the system to his particular wants or needs. Security system 10 has delay times built into the system which allows the owner or operator a set amount of time to leave the unit 14 before the security system 10 is activated or armed and a set time to enter the unit 14 and deactivate or disarm the security system 10 before it is triggered by his intrusion. The sensor means 16 are grouped into groups 30 which can be controlled, to a degree, from the key pad 34. The groupings are (1) the security sensors, e.g. pressure mat, glass breakage, the opening of windows or doors, motion detector, etc., (2) the hazard sensors, e.g. LP gas, fire, smoke, carbon monoxide, low battery, high water in bilge, etc. and (3) the infrared motion detector. Groups (1) and (3) can be activated and/or deactivated together as one group from the key pad 34. Group (2) can be activated and/or deactivated as a separate group. After groups (1) and (3) have been activated, group (3) can be deactivated, leaving group (1) activated. So, basically, key pad 34 allows the operator to control and configure the system.

An alarm device 36 is operatively connected to receiver means 18 to receive an activating signal when receiver means 18 receives a proper and recognized transmitted coded signal from a sensor means 16 associated with the individual or predetermined unit 14 with which the receiver means 18 is associated as part of the security system 10.

Detector 38 is operatively connected to the housing of receiver means 18 to activate the security system 10 if an intruder attempts to obtain access to the receiver means 18 and deactivate the security system 10 before it is activated by the intruder's entry into the individual or predetermined unit 14. In the preferred embodiment, detector 38 comprises a magnetic switch.

Panic switch 40 is a wireless transmitter similar to transmitter 26 which transmits a coded signal through the atmosphere to receiver means 18 when activated. The panic switch 40 is portable and is activated to trigger the security system 10 if the owner or occupant of the unit desires to trigger the alarm to signal for help if they are ill, have fallen, hear someone attempting to break into the individual or predetermined unit 14.

A display unit 42, which is part of the key pad and display unit 35, is operatively coupled to receiver means 18 to display a code designating which sensor has been activated.

A coded signal output is sent to the slave transmitter 20 via cable 44 and activates the slave transmitter 20 to transmit a coded signal through the atmosphere. The slave transmitter 20 includes encoder means 46 for setting a twelve bit digital code which identifies the particular individual or predetermined unit where the slave transmitter 20 is located. In the preferred embodiment, the selection of the twelve bit digital code is provided by DIP switches. In the operation of the individual unit system 12 when a sensor means 16 is activated or triggered, sensor means 16 transmits the twelve bit coded signal through the atmosphere to receiver means 18. Receiver means 18 checks the eight bits of the coded signal to determine if the received signal is from a sensor means associated with the same individual or predetermined unit 14 with which the receiver means 18 is associated. If the received signal is from a sensor means 16 which is on the same individual unit 14 as the receiver means 18, receiver means 18 will check to determine if the individual unit system 12 is activated or not. If the individual unit system 12 is activated then receiver means 18 will cause the code, for the particular sensor means 16 which has been triggered, to appear on display unit 42. Receiver means 18 then sends the four bits of data, which designates the type of sensor means 16 which has been activated, on to the slave transmitter 20. If the individual unit system 12 is not activated, nothing additional happens. Slave transmitter 20 adds twelve digital bits, which designates the particular individual unit 14 where the individual unit system 12, which has triggered, is located and transmits the sixteen bit coded signal through the atmosphere.

Figure 2:
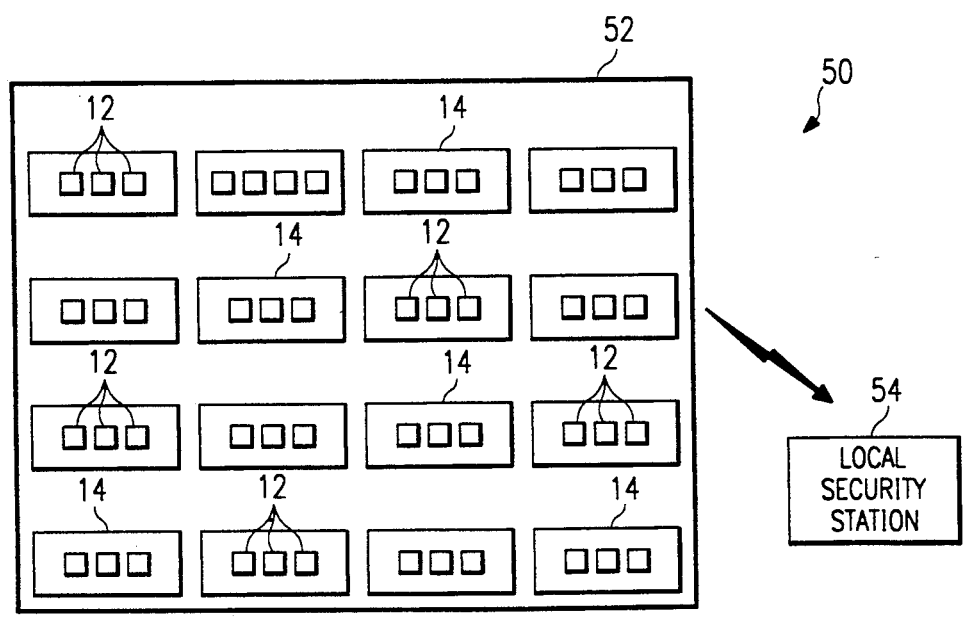
FIG. 2 is a simplified block diagram showing the security system in accordance with an additional embodiment of the present invention.

With further reference to the drawing and to FIG. 2 in particular, shown therein and generally designated by the reference character 50 is a security system in accordance with an additional embodiment of this invention. As illustrated, the security system 50 is directed to a security system for a given or designated security area 52 which includes a plurality of individual or predetermined units 14. Security system 50 comprises a plurality of individual unit systems 12 installed in and around each individual or predetermined unit 14 and a local security station 54. It will be appreciated that the local security station 54 may be within or outside the given or designated security area 52.

Figure 3:
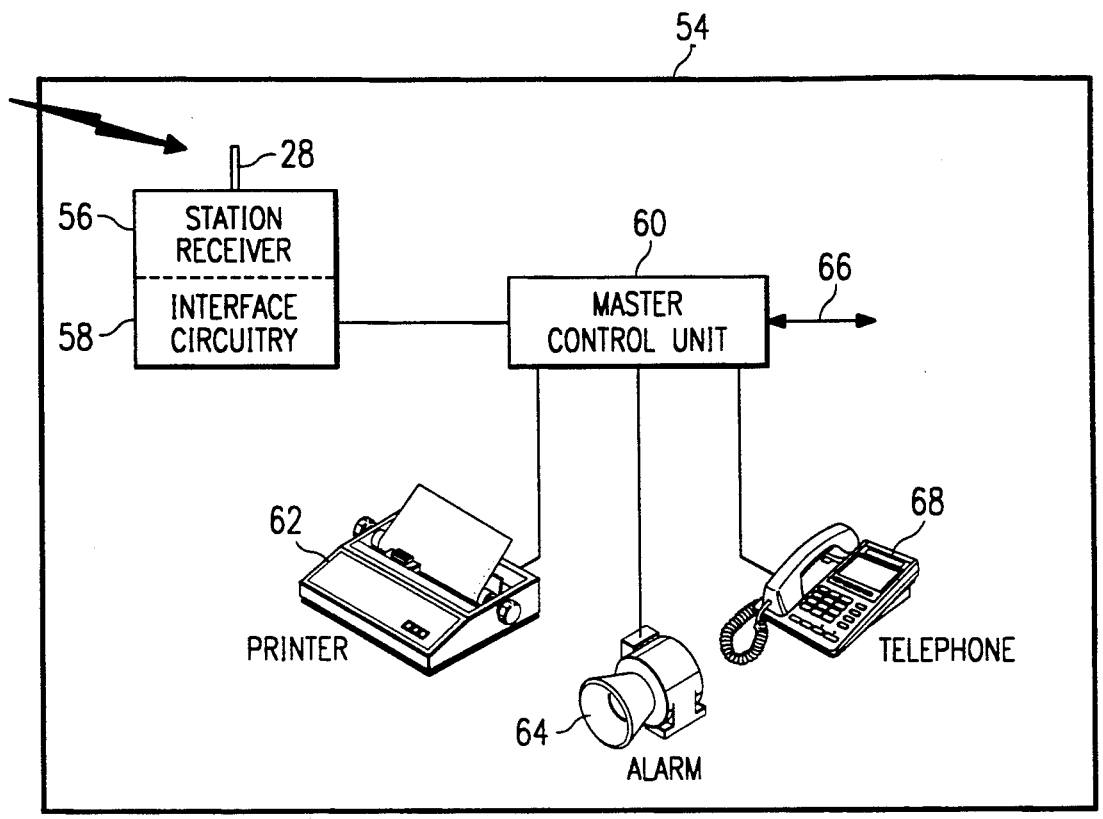
FIG. 3 is a simplified block diagram showing the local security station of the present invention.

With reference to FIG. 3, the local security station 54 is shown and comprises a station receiver 56 whose output is provided to interface circuitry 58 whose output is provided to the master control unit 60. Master control unit 60 provides an output to printer 62, an output to alarm 64 and an output and input line 66 which is connected to the telephone line jack of the telephone line to the telephone company or to a cellular telephone. A touch-tone telephone 68 provides an input to the master Control unit 60 and receives an input from the speech synthesizer 78 in the master control unit 60.

Figure 4:
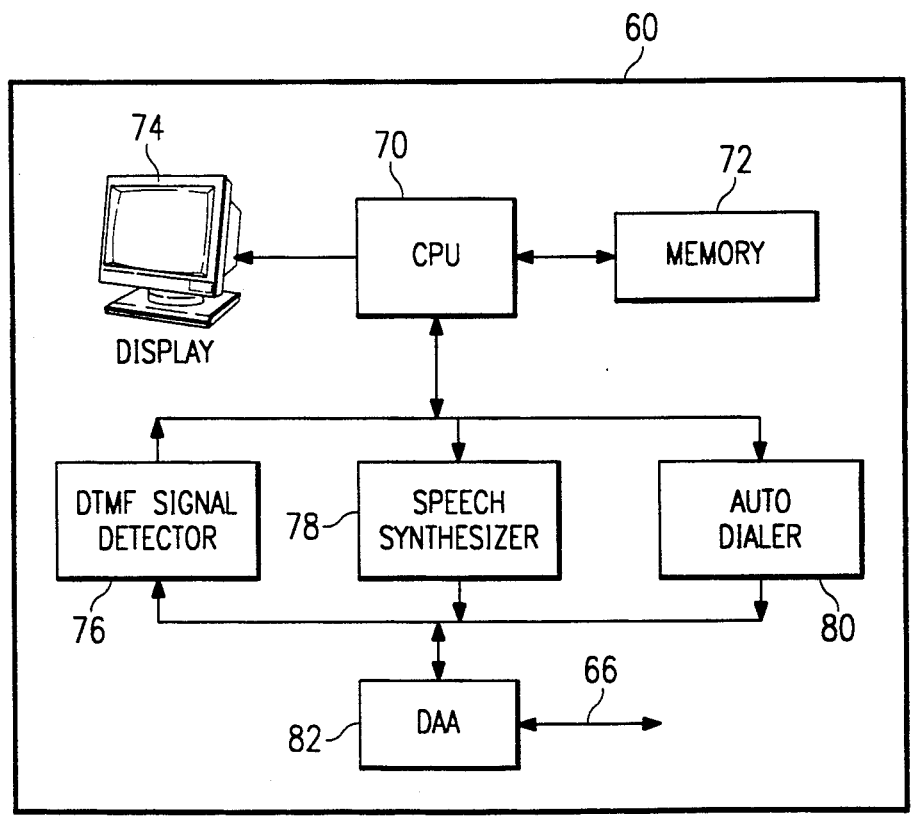
FIG. 4 is a simplified block diagram showing the master control unit of the local security station of the present invention.

With reference to FIG. 4, the master control unit 60 is shown and comprises a CPU 70 operatively connected to memory 72 and providing an output to display 74. DTMF signal detector 76, speech synthesizer 78 and auto dialer 80 are connected in parallel between CPU 70 and DAA 82. DAA 82 is connected to the telephone line from the telephone company. Memory 72 includes the program instructions for CPU 70 to perform the various tasks required as well as the messages to be transmitted by the speech synthesizer 78 and the telephone numbers to be dialed by auto dialer 80.

In the operation of the security system 50, the individual unit systems 12 operate as previously discussed. When a slave transmitter 20 transmits the sixteen bit coded signal through the atmosphere, it is received by antenna 28 and output to station receiver 56 whose output is provided through interface circuitry 58 to the master control unit 160. The master control unit 60 checks to make certain it is on and if it is on the master control unit 60 will provide an activating signal to the alarm 64 located at the local security station 54 and sound alarm 64. If there is personnel in the local security station 54, they have a predetermined time, e.g. three minutes, in which to pick up the touch-tone telephone 68 and dial a predetermined intercept code which goes to the CPU 70 and cancels the alarm sequence. If there is not any personnel in the local security station 54, the master control unit 60 will start the sequence of dialing three telephone numbers, which have been placed in memory in the master control unit 60. At the same time, the CPU 70 will output information to the display unit 74 and the printer 62 which will include (1) the time, (2) the date, (3) the individual unit identification where the alarm occurred and (4) the type of alarm. The three telephone numbers could include the police, an independent security business, the owner of the designated security area, a beeper number, the home of an individual, etc. The three telephone numbers will be sequentially dialed until someone answers one of the dialed phones. When one of the dialed phones is answered, the person who answers the phone must dial in a predetermined sequence of numbers. The master control unit 60 then knows that someone has acknowledged the receipt of the alarm notification and the speech synthesizer outputs a message informing the individual on the phone of the details regarding the alarm. These details will include (1) the time of the alarm, (2) the date of the alarm, (3) the individual unit identification where the alarm occurred and (4) the type of alarm. When one of the three dialed phones has been answered, the printer will print out an acknowledgment message which will include (1) the time the alarm was acknowledged, (2) the date the alarm was acknowledged and (3) the party who acknowledged the notification of the alarm by the sequence of numbers dialed by the party.

Another feature of the security system 50 is that the master control unit 60 is programmable from any touch-tone phone. Normally the individual unit systems 12, with the exception of the slave transmitter 20, are sold to be installed in the individual or predetermined units 14. The company which manufactures the security system 50 leases the slave transmitter 20 to the owner of the designated security area 52 where the individual or predetermined units 14 are stored or housed, who in turn sub-leases the slave transmitter 20 to the owners of the individual or predetermined units 14. Each month the company is to collect a set amount for each slave transmitter 20 leased to the owner of the designated security area 52. If for any month, the company does not receive a check from the owner of the designated security area 52, the security system 50 goes into a programmed ten day grace period in which it will continue to operate. After the ten day grace period, the master control unit 60 of the security system 50 will shut down in accordance with a predetermined program placed in memory 72. When a check is received, a predetermined code will be sent over the telephone to the master control unit 60 which will update the master control unit 60 and allow it to operate for another month.

Thus, it is apparent that there has been provided in accordance with this invention, a security system for monitoring a plurality of individual units from a centralized location.

Although the present invention has been described with reference to a presently preferred embodiment, it will be appreciated by those skilled in the art that various modifications, alternatives, variations, etc., may be made without departing from the spirit and scope of the invention as defined in the appended claims.

We claim:

1. A security system for a plurality of individual vehicles congregated together in a given security area, said security system comprises:
 a plurality of individual vehicle security systems and a central unit;
 wherein each of said individual vehicle security systems is associated with a respective one of said individual vehicles;
 wherein each of said individual vehicle security systems comprises:
 (a) a plurality of sensor means, each sensor means being operatively mounted at the respective individual vehicle and structured to be actuated by the occurrence of a respective predetermined event associated with the respective individual vehicle, each sensor means including means for producing an encoded sensor signal upon the occurrence of the predetermined event for that sensor means such that the encoded sensor signal identifies the respective sensor means producing the encoded sensor signal and the respective individual vehicle with which the respective sensor means is associated, each sensor means including a transmitter for transmitting the thus produced encoded sensor signal through the atmosphere;

(b) a receiving means located at the respective individual vehicle, each receiving means including means for receiving the transmitted encoded sensor signals from the plurality of sensor means of the respective individual vehicle security system as well as from sensor means of individual vehicle security systems for other individual vehicles in the given security area, each receiving means including means for recognizing an encoded sensor signal transmitted by a sensor means of the respective individual vehicle security system and for producing an output signal only upon receipt and recognition of an encoded sensor signal transmitted by a sensor means of the respective individual vehicle security system;

(b) a slave transmitter means operatively coupled to the receiving means for the respective individual vehicle security system to receive an output signal from the receiving means of the respective individual vehicle security system, the slave transmitter means including means for producing an encoded vehicle signal upon the receipt of an output signal from the receiving means of the respective individual vehicle security system such that the encoded vehicle signal identifies the respective sensor means producing the encoded sensor signal and the respective individual vehicle with which the respective sensor means is associated, each salve transmitter means including a transmitter for transmitting the thus produced encoded vehicle signal through the atmosphere;

and wherein said central unit comprises:

(a) a central receiver means positioned to receive an encoded vehicle signal transmitted by the slave transmitter means of any of said individual vehicle security systems, to decode the thus received encoded vehicle signal and provide a control signal in response thereto;

(b) a master control unit to receive a control signal from said central receiver means and provide output functions in response to the receipt of a control signal from said central receiver means.

2. A security system in accordance with claim 1, wherein each of said individual vehicle security systems further comprises:

a keypad and display means located at the respective individual vehicle and operatively coupled to the receiving means of the respective individual vehicle security system to exchange coded signals with that receiving means for selectively activating individual sensor means in the plurality of sensor means of the respective individual vehicle security system; and an alarm unit located at the respective individual vehicle and connected to the keypad and display means of the respective individual vehicle security system to receive a signal from that keypad and display unit upon the occurrence of the actuation of a sensor means of the respective individual vehicle security system.

3. A security system in accordance with claim 2 wherein said plurality of individual vehicles in a given security area comprises a plurality of boats in a marine.

4. A security system in accordance with claim 2 wherein said plurality of individual vehicles in a given security area comprises a plurality of recreational vehicles in a storage area.

5. A security system in accordance with claim 2 wherein said central unit further comprises:

a central processing means operatively coupled to said central receiver means to receive a control signal outputted by said central receiver means;

a display unit operatively coupled to said central processing means; and a message unit and an auto dialer operatively connected in parallel between said central processing means and a connector for connecting to a telephone line.

6. A security system in accordance with claim 5 wherein said plurality of individual vehicles in a given security area comprises a plurality of boats in a marine, with each individual vehicle being a boat in a slip in the marina.

7. A security system in accordance with claim 5 wherein said plurality of individual vehicles in a given security area comprises a plurality of boats in a marina, with each individual vehicle being a boat in a dry stack in the marina.

8. A security system in accordance with claim 5 wherein said plurality of individual vehicles in a given security area comprises a plurality of vehicles in a storage area.

9. A security system in accordance with claim 5 wherein at lest one of the sensor means in each individual vehicle security system includes a magnetic switch.

10. A security system in accordance with claim 5 wherein at least one of the sensor means in each individual vehicle security system includes an infrared sensor.

11. A security system in accordance with claim 5 wherein the plurality of sensor means in each individual vehicle security system comprise at lest two sensors selected from the group consisting of a sensor to detect smoke, a sensor to detect the presence of carbon monoxide, a sensor to detect the presence of LP gas, a sensor to detect the presence of water, a sensor to detect glass breakage, a sensor to detect an opened window, a sensor to detect an opened door, and a sensor to detect motion.

12. A security system in accordance with claim 5 wherein the plurality of sensor means in each individual vehicle security system comprise a sensor to detect smoke, a sensor to detect the presence of motion, and a sensor to detect the presence of water.

13. A security system in accordance with claim 5 wherein said means for producing a encoded sensor signal includes switches to set the encoding.

14. A security system in accordance with claim 1 wherein said central unit further comprises:

a central processing means operatively coupled to said central receiver means to receive a control signal outputted by said central receiver means;

a display unit operatively coupled to said central processing means; and a message unit and an auto dialer operatively connected in parallel between said central processing means and a connector for connecting to a telephone line.

15. A security system in accordance with claim 1 wherein said plurality of individual vehicles in a given security area comprises a plurality of boats in a marina, with each individual vehicle being a boat in a slip in the marina.

16. A security system in accordance with claim 1 wherein said plurality of individual vehicles in a given security area comprises a plurality of boats in a marina, with each individual vehicle being a boat in a dry stack in the marina.

17. A security system in accordance with claim 1 wherein said plurality of individual vehicles in a given security area comprises a plurality of vehicles in a storage area, with each individual vehicle being a boat.

18. A security system in accordance with claim 1 wherein at least one of the sensor means in each individual vehicle security system includes a magnetic switch.

19. A security system in accordance with claim 1 wherein at least one of the sensor means in each individual vehicle security system includes an infrared sensor.

20. A security system in accordance with claim 1 wherein the plurality of sensor means in each individual vehicle security system comprise at least two sensors selected from the group consisting of a sensor to detect smoke, a sensor to detect the presence of carbon monoxide, a sensor to detect the presence of LP gas, a sensor to detect the presence of water, a sensor to detect glass breakage, a sensor to detect an opened window, a sensor to detect an opened door, and a sensor to detect motion.

21. A security system in accordance with claim 1 wherein the plurality of sensor means in each individual vehicle security system comprise a sensor to detect smoke, a sensor to detect the presence of motion, and a sensor to detect the presence of water.

22. A security system in accordance with claim 1 wherein said means for producing a encoded sensor signal includes switches to set the encoding.

23. A method of monitoring a plurality of individual vehicles which are congregated together in a given security area, which method comprises:
providing an individual vehicle security system for each individual vehicle, each individual vehicle security system comprising:
(a) a plurality of sensor means, each sensor means being operatively mounted at the respective individual vehicle and structured to be actuated by the occurrence of a respective predetermined event associated with the respective individual vehicle;
(b) a receiving means located at the respective individual vehicle; and
(c) a slave transmitter means operatively coupled to the receiving means for the respective individual vehicle security system to receive an output signal from the receiving means of the respective individual vehicle security system;
producing a encoded sensor signal upon the occurrence of the predetermined event for a respective sensor means such that the encoded sensor signal identifies the respective sensor means producing the encoded sensor signal and the respective individual vehicle with which the respective sensor means is associated;
transmitting the thus produced encoded sensor signal through the atmosphere to the receiving means of each of the plurality of individual vehicle security systems;
causing the receiving means for the respective individual vehicle security system to receive the transmitted encoded sensor signals from the plurality of sensor means of the respective individual vehicle security system as well as from sensor means of individual vehicle security systems for other individual vehicles in the given security area,
causing the receiving means for the respective individual vehicle security system to recognize only encoded sensor signals transmitted by sensor means of the respective individual vehicle security systems;
causing the receiving means for the respective individual security system to produce an output signal only upon receipt and recognition of an encoded sensor signal transmitted by a sensor means of the respective individual vehicle security system;
causing the slave transmitter means of the respective individual vehicle security system to produce an encoded vehicle signal upon the receipt of an output signal from the receiving means of the respective individual vehicle security system such that the encoded vehicle signal identifies the respective sensor means producing the encoded sensor signal and the respective individual vehicle with which the respective sensor means is associated;
transmitting the thus produced encoded vehicle signal through the atmosphere;
receiving the thus transmitted encoded vehicle signal at a central unit;
decoding the thus received encoded vehicle signal and providing a control signal in response thereto;
actuating an alarm at the central unit in response to said control signal;
recording the date, the time, an identification of the individual vehicle at which an encoded sensor signal was produced, and the type of sensor means which produced the encoded sensor signal; and
if the thus actuated alarm is not deactivated within a predetermined period of time, dialing at least one preset telephone number and providing a recorded message when the first one of said at least one preset telephone number is answered, and if an acknowledgment of the recorded message is received, recording the time the recorded message was acknowledged.

24. A method in accordance with claim 23, further comprising the step of storing in the central unit instructions to shut down the central unit after a set period of time unless the central unit receives activation instructions.

25. A method in accordance with claim 24, further comprising the step of transmitting activation instructions to the central unit during the set period of time to activate the security system for an additional time period.

* * * * *

UNITED STATES PATENT AND TRADEMARK OFFICE
CERTIFICATE OF CORRECTION

PATENT NO. : 5,319,698
DATED : June 7, 1994
INVENTOR(S) : William D. Wallace et al It is certified that error appears in the above-identified patent and that said Letters Patent is hereby corrected as shown below:

Column 7, line 27, delete "(b)" and insert --(c)--.

Column 7, line 40, delete "salve" and insert --slave--.

Column 8, line 8, delete "marine" and insert --marina--.

Column 8, line 26, delete "marine" and insert --marina--.

Column 8, line 39, delete "lest" and insert --least--.

Column 8, line 46, delete "lest" and insert --least--.

Column 10, lines 18-19, delete "systems;" and insert --system;--.

Signed and Sealed this

Thirtieth Day of August, 1994

Attest:

BRUCE LEHMAN

Attesting Officer

Commissioner of Patents and Trademarks